June 26, 1956 W. R. KEEN 2,752,277
CARPETING
Filed July 14, 1954

INVENTOR.
William R. Keen,
BY Paul & Paul
ATTORNEYS.

United States Patent Office 2,752,277
Patented June 26, 1956

2,752,277
CARPETING

William Rollin Keen, Media, Pa., assignor to Collins & Aikman Corporation, Philadelphia, Pa., a corporation of Delaware Application July 14, 1954, Serial No. 443,383

1 Claim. (Cl. 154—49)

This invention relates to carpeting. More particularly, it is concerned with carpeting intended for automobiles.

My invention is directed toward the provision of carpeting which can be economically produced in quantity with minimum use of textile yarns and which nevertheless is of sufficient thickness and weight for capacity to lie perfectly flat and to effectively resist wear and disintegration under rough usage.

Figure 1:
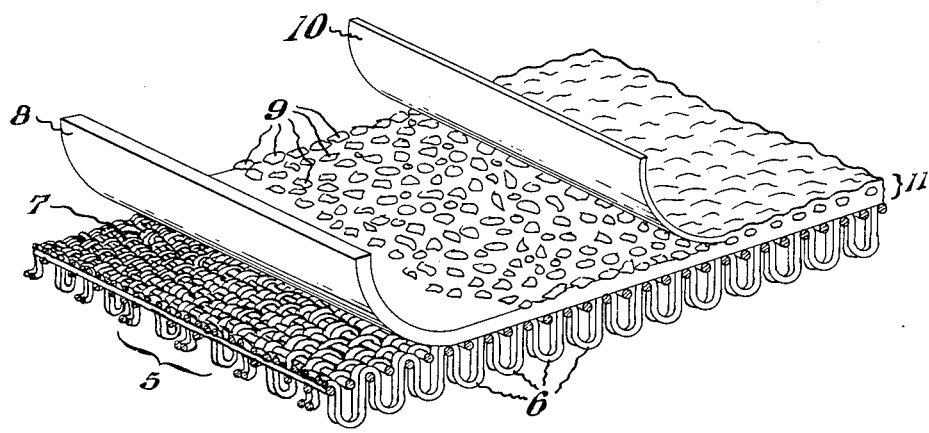
Figure 2:
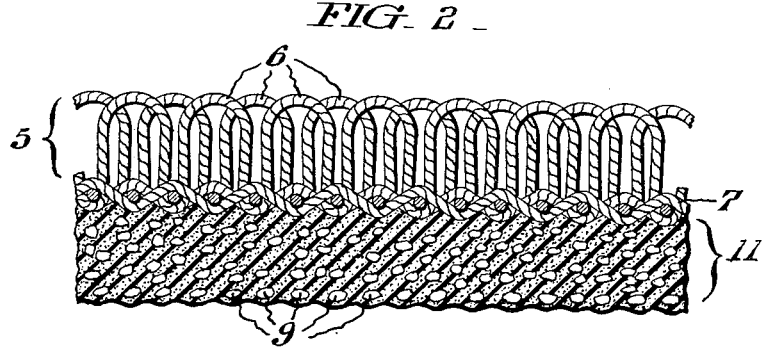

Other objects and attendant advantages of the invention will appear from the following detailed description of the attached drawings wherein:

Fig. 1 is a perspective view showing how my improved carpeting is constructed; and Fig. 2 is a fragmentary view of the carpeting in longitudinal section and drawn to a larger scale.

As herein exemplified, my improved carpeting material comprises a face layer 5 of pile fabric in which the pile loops 6 are suitably interlaced with the warps and the wefts of a ground weave 7. In accordance with the invention, I first apply and bond to the back of the fabric 5, as shown in Fig. 1, a relatively heavy layer 8 of latex or other adhesive. While the layer 8 is still in a wet or tacky condition, I apply thereto, in turn, by sifting or in any other suitable manner, a layer of finely divided granular material 9 such for example as "No. 10" mesh ground cork or rubber, asbestos, wood flour, or ground fiber flock, which will cling to the wet adhesive and become embedded therein. I finally apply over the layer 9, by spraying or otherwise, a thinner bonding layer 10 of latex or adhesive similar to that used for the first layer 8. The purpose of the last layer 10 is to entrap and seal in the particles 9 of the bulky intermediate granular layer 9. After drying or curing and integration of the material of the layers 9 and 10, as at 11 in Fig. 2, the backing constituted by said layers will be firmly anchored to the textile fabric layer 5.

As alternatives, I may use for the first layer 8, latex loaded up to 200% with clay or other pulverulent material, and for the filler layer 9, I may use mixtures of ground cork and rubber, or mixtures of any of the other granular materials above mentioned. In each case, however, the final bonding layer will be preferably of latex alone. The thicknesses of the various layers may of course be varied depending upon the stiffness, weight, rigidity, resilience and bulk desired in the final product by varying the nature of the materials used for the various layers of the backing.

As another alternative, instead of latex for the first and final layers of the backing, other aqueous or solvent dispersions of rubber, elastomers and resins may be used depending upon whether frictional (non-skid) or sliding characteristics are desired. The latter will greatly improve the working characteristics of rugs or mats during cutting and/or sewing operations. Furthermore, knitted textile fabric may be employed in lieu of the woven fabric herein shown and described by way of example. The expression "textile fabric" as used in the appended claims may therefore be considered as comprehensive of both types.

Having thus described my invention, I claim:

In carpeting or the like, a face layer of fabric having looped pile projecting from a base weave of interlaced warps and wefts; a heavy stuffer layer of latex bonded to the back of the base weave of the fabric and anchoring the pile in said base weave; said stuffing layer having coarse granules of cork embedded therein with some of the granules protruding from the back surface thereof; and a relatively thin layer of latex forming spot projections over the protruding cork granules to serve as an anti-slip surface for the carpeting.

References Cited in the file of this patent
UNITED STATES PATENTS

| | | |
|---|---|---|
| 1,441,665 | Desmarest | Jan. 9, 1923 |
| 1,476,226 | Grimoin-Sanson | Dec. 4, 1923 |
| 1,558,563 | Newton | Oct. 27, 1925 |
| 1,816,574 | Foster | July 28, 1931 |
| 2,358,204 | Bird | Sept. 12, 1944 |

FOREIGN PATENTS

| | | |
|---|---|---|
| 301,195 | Great Britain | Nov. 29, 1928 |